United States Patent Office.

WILLIAM WARD, OF CLEVELAND, OHIO.

Letters Patent No. 75,497, dated March 10, 1868.

IMPROVED OIL FOR PAINT, &c.

*The Schedule referred to in these Letters Patent and making part of the same.*

TO ALL WHOM IT MAY CONCERN:

Be it known that I, WILLIAM WARD, of Cleveland, in the county of Cuyahoga, and State of Ohio, have invented certain new and useful Improvements in Oil for Paints, &c.; and I do hereby declare that the following is a full and complete description of the same.

The nature of my invention relates to utilizing the waste from paper-mills, said waste being the liquid which runs from the bleaching-apparatus, and with which, in combination with certain oils, I produce a composition or an oil to be used as a substitute for linseed oil in the various preparations of paints, putty, and cement, or for all the purposes for which pure linseed oil is ordinarily used, for painting, &c.; and I do hereby declare that the following is a full and complete description of the ingredients, and manner of compounding the same.

This liquor or waste is subjected to a process of cleansing, by filtration or otherwise, if intended for fine work. With this liquor is compounded, in about equal parts, according to the strength of the liquid, linseed oil, or other oils of analogous nature, or with the distillates of petroleum. This fluid or waste, when mixed with linseed oil in about the proportion above said, forms a thick semi-transparent fluid or oil, which may be thinned down to a proper consistency for painting, by the use of turpentine or benzine, in the ordinary way, and which, of itself, forms an excellent varnish, which soon dries, having a hard, glassy surface, and fire-proof. This composition readily combines with the various pigments, as white lead, zinc, ochres, and other coloring-materials ordinarily used for painting, making a hard, durable, glassy, and fire-proof paint, which can be laid on with a brush with the same facility as the best linseed-oil paint, and at little more than one-half the expense.

This oil, when combined with whiting and lead, makes a good putty for glazing, much stronger and more tenacious than ordinary putty, and will not crack and peel off by exposure to the weather; and when used simply in combination with lime, it forms a strong, hard cement, or stone-like substance, which, for roofing purposes, when made of a proper consistency, can be spread on with a trowel, on tin, sheet iron, or paper. This coating soon becomes as hard and strong as slate.

What I claim as my improvement, and desire to secure by Letters Patent, is—

1. The herein-described compound, consisting of the waste and linseed oil, or its equivalent, when compounded in the manner, and in any proportion, for the purpose substantially as set forth.

2. The cement, consisting of waste, linseed oil, and lime, or its equivalents, when compounded in the manner and for the purpose substantially as described.

3. The utilizing of the waste from the bleaching-apparatus of paper-mills, by compounding the said waste with linseed oil, or its equivalents, or with crude petroleum, or with its distillates; also, in compounding the same with lime in its various conditions, and with the pigments used for paint, in the manner substantially as described.

WILLIAM WARD.

Witnesses:
W. H. BURRIDGE,
J. HOLMES.